United States Patent
Roark (10) Patent No.: US 10,657,842 B2
(45) Date of Patent: May 19, 2020

(54) NAVIGATION SYSTEM (71) Applicant: Garrett Roark, Cheyenne, WY (US)

(72) Inventor: Garrett Roark, Cheyenne, WY (US)

( * ) Notice: Subject to any disclaimer, the term of this patent is extended or adjusted under 35 U.S.C. 154(b) by 0 days.

(21) Appl. No.: 16/164,380

(22) Filed: Oct. 18, 2018

(65) Prior Publication Data

US 2019/0051214 A1 Feb. 14, 2019

Related U.S. Application Data (63) Continuation of application No. 15/880,355, filed on Jan. 25, 2018, now Pat. No. 10,134,305, which is a continuation of application No. 15/605,713, filed on May 25, 2017, now Pat. No. 9,959,781.

(60) Provisional application No. 62/342,002, filed on May 26, 2016.

(51) Int. Cl.
- G09B 21/00 (2006.01)
- A47K 17/00 (2006.01)
- G08B 7/06 (2006.01)
- A61H 3/06 (2006.01)

(52) U.S. Cl.
CPC .......... *G09B 21/006* (2013.01); *A47K 17/00* (2013.01); *A61H 3/061* (2013.01); *G08B 7/06* (2013.01); *G09B 21/007* (2013.01); *A61H 2003/063* (2013.01)

(58) Field of Classification Search
CPC ...... G06F 3/016; G06F 3/011; G06F 3/03543; G06F 3/04883; G06F 2203/014; G06F 3/014; G06F 3/0346; G06F 3/03544; G06F 3/038; G06F 3/0338
USPC ....................................................... 340/4.12
See application file for complete search history.

(56) References Cited

U.S. PATENT DOCUMENTS

| | | | |
|---|---|---|---|
| 9,316,502 B2 * | 4/2016 | Moore | G01C 21/165 |
| 9,536,452 B2 * | 1/2017 | Lydecker | G09B 21/008 |
| 9,582,826 B2 * | 2/2017 | Calman | G06Q 30/0639 |
| 9,733,334 B2 * | 8/2017 | Serrano Olmedo | G01S 5/0009 |
| 9,734,725 B2 * | 8/2017 | Gordon | G08G 5/0069 |
| 9,770,382 B1 * | 9/2017 | Ellis | G01S 17/93 |

* cited by examiner

*Primary Examiner* — Mark S Blouin
(74) *Attorney, Agent, or Firm* — Holland & Hart LLP (57) ABSTRACT

The technology disclosed herein includes a navigation system for a visually impaired person. The navigation system may include a plurality of fixtures, a plurality of installations, wherein each installation is electronically connected to a fixture, and an electronic device, the electronic device configured to receive auditory or tactile signals from each installation and produce a signal indicative of a fixture location.

20 Claims, 9 Drawing Sheets

NAVIGATION SYSTEM

CROSS-REFERENCE TO RELATED APPLICATIONS

The present application is a continuation application of pending U.S. Non-Provisional patent application Ser. No. 15/880,355 entitled NAVIGATION SYSTEM," filed on Jan. 25, 2018, which is a continuation application of issued U.S. Pat. No. 9,959,781 entitled "NAVIGATION SYSTEM," issued on May 1, 2018, which claims the benefit of U.S. Provisional Patent Application Ser. No. 62/342,002, entitled "RESTROOM NAVIGATION SYSTEM," filed on May 26, 2016, all of which are specifically incorporated by reference for all it discloses and teaches.

BACKGROUND

There are approximately 10,000,000 people in the United States living with vision impairment. People with vision impairments face challenges when navigating public places, including restroom facilities. For example, public restroom layouts have various designs. A person with vision impairment may have difficulty locating an unoccupied toilet, a sink, a soap dispenser, paper towels, a trash can, and an exit. The difficulties in navigating public facilities can prevent people with vision impairments from going to public places.

SUMMARY

The disclosed navigation system provides a plurality of installations electronically connected to fixtures in a room. When activated, each installation provides a user with audio or tactile feedback to locate a specific corresponding fixture. In some implementations, audio or tactile signals are communicated to a user via a remote, a smart phone, or a cane. In some implementations, the navigation system may also provide a user with an occupancy status of a specific fixture. In some implementations, an installation pathway transmits signals regarding a location and/or occupancy of fixtures.

This Summary is provided to introduce a selection of concepts in a simplified form that are further described below in the Detailed Description. Other implementations are also described and recited herein. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWINGS

The described technology is best understood from the following Detailed Description describing various implementations read in connection with the accompanying drawings.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular implementation, it should be appreciated that the features described with respect to one implementation may be incorporated with other implementations as well. Similarly, however, no single feature or features of any described implementation should be considered essential to the invention, as other implementations of the invention may omit such features.

The disclosed technology includes a navigation system to assist a vision impaired person in locating various fixtures. Fixtures may be defined as appliances, utilities, and other components (e.g., a toilet stall, a toilet, a urinal, a sink, a soap dispenser, a trash can, etc.). The navigation system may be used in a public restroom or any other environment where a visually impaired individual may need assistance in navigation. In some implementations, the navigation system may be implemented in an environment other than a restroom (e.g., an office building, a street, a zoo, public transportation, etc.).

The navigation system disclosed herein may include a sensor system that alerts the user to specific locations of the various appliances and components, and whether the various appliances and components are in use. For example, a user can navigate through a public restroom from an entry door to an unoccupied urinal or toilet stall to a sink, to a soap dispenser, to a hand dryer, and exit the restroom via auditory or tactile communication signals. The communication signals may include a variety of methods, including an audio alert or a vibration from an apparatus worn or held by the user. As a result, the vision impaired user of the navigation system can use a public restroom without assistance and without encountering obstacles.

In some implementations, a user may trigger a switch affixed to an entry way of a room or location. For example, the user may trigger a switch on a key fob or on a device, such as a smart phone, held by the user as the user approaches a certain location. Communication paths, such as radio frequency, between the key fob or other apparatus and sensors activate notifications to the user. A device may be equipped with a non-line of sight communication receiver such as RF or IR, to receive an activation signal.

In some implementations, the navigation system may include an infrared sensor or other proximity sensor, which determines if a component (e.g., a toilet, a urinal, a sink, etc.) is occupied. If the component is occupied, a sound tone will activate and notify the user of the occupancy status. For example, a urinal may signal one beep to notify a user of its location, and two beeps if the urinal is occupied.

Determining whether a component is occupied may be determined by actual use of the component (e.g., a sink turned on) or a sensor determining another user in a certain proximity of the component. In some implementations, determining a component is occupied may result in an auditory or tactile communication to the user or a passive infrared sensor (PIR) interrupting a signal and preventing feedback to the user. Specifically, in some implementations, an audio signal may only notify a user when a component is available.

The feedback or notifications may be a plurality of different kinds of auditory or sensory feedback specific to each component in the environment. Audio signals and sensory signals may be communicated in a variety of methods. For example, a tone, beep, ring, words (e.g., "toilet available," "sink available," etc.), or other auditory notification may transmit sounds to the user. In another example, vibrations in a device or apparatus may alert a user to certain signals. Other forms and combinations of auditory and sensory feedback are contemplated.

Figure 1:
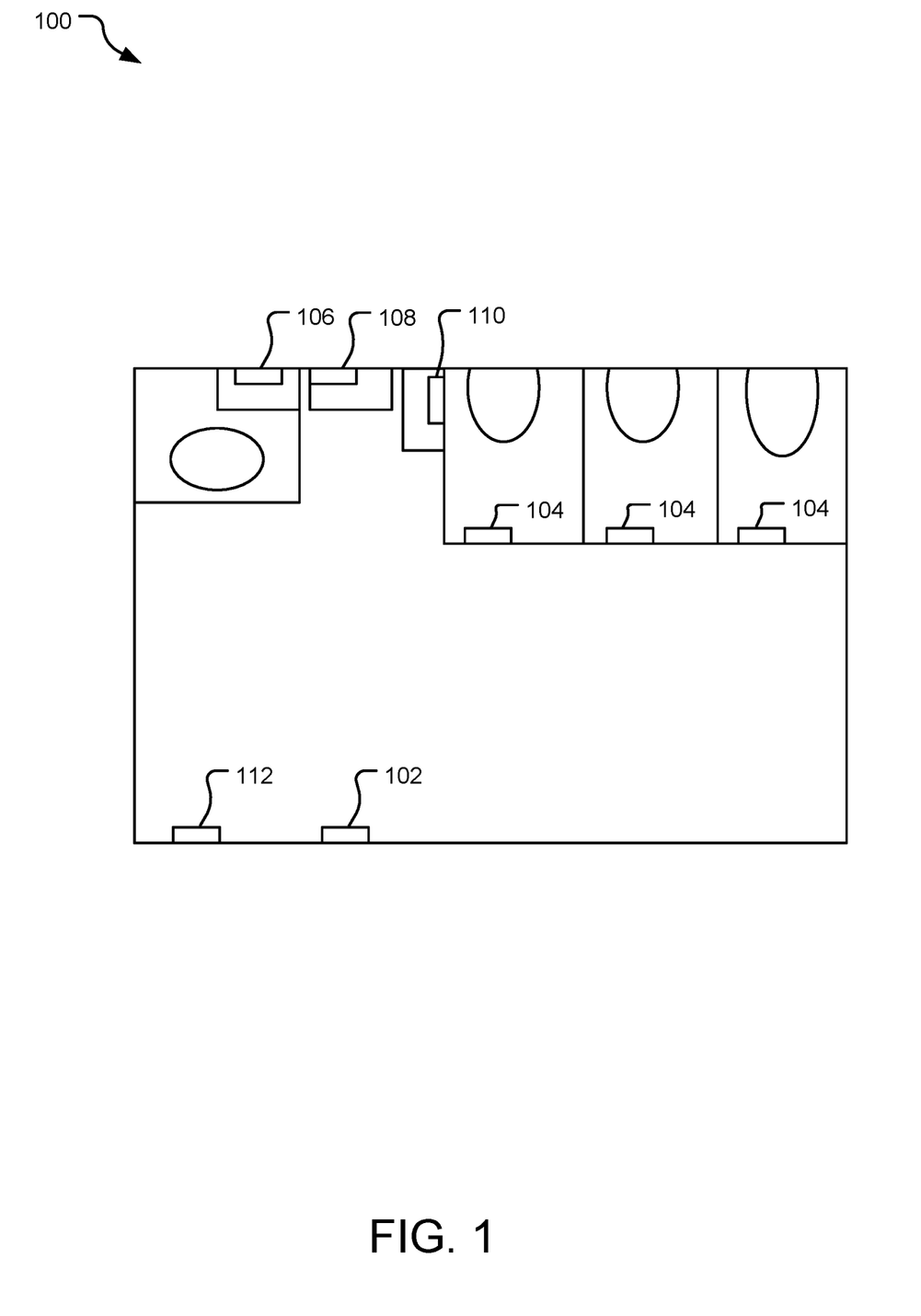
FIG. 1 is an overhead view of an example navigation system installed in a public restroom.

FIG. 1 is an overhead view of an example navigation system 100 installed in a public restroom. When a user enters the restroom, the user may trigger the navigation system 100 to start by flipping a switch on a panel 102. The panel 102 may also include a Braille map of the restroom for easier navigation. In some implementations, the navigation system 100 may turn on automatically when the user enters the restroom with a corresponding device (not shown).

In some implementations, the navigation system may be include other auto features or be incorporated into other auto features in a restroom, such as an auto flush feature or auto water on/off at a sink. For example, if a sink automatically turns off, a sensor may identify the end of use of the sink and send a notification signal that a sink is available for use.

When the user triggers the navigation system 100 to start, a speaker or other device incorporated in a utility installation or into the user's corresponding device produces audio signals. A utility installation may be a sink installation 106, a soap installation 108, a paper towel installation 110, an exit installation 112, etc. Other installations are contemplated. For example, installations may be added for air powered hand dryers, personal hygiene product dispensers, and any utilities or components found in a restroom. In some implementations, a urinal installation may be included in the navigation system.

Audio signals produced by a utility installation may be a specific sound, such as a sequence of sounds or a specific ring tone. For example, a toilet installation 104 may make a first sound (e.g., one beep). A sink installation 106 may make a second sound (e.g., two beeps). In some implementations, the installations may make distinctive sounds. In one implementation, the sound may be the name of the location in the bathroom. For example, the sink installation 106 may simply speak the word "sink." In another implementation, each installation would have a separate tone that would be easily differentiated from the other tones. In some implementations, the sounds can occur repeatedly. In some implementations, the sounds occur in sequence while the user is in the restroom.

An installation may include a proximity sensor that determines whether a utility or component is available or occupied. For example, the toilet installation 104 may include a proximity sensor that communicates to the user that a stall is available occupied. To indicate that a stall is available, a second tone may follow the first tone. Alternatively, the circuit in the toilet installation 104 may include a PIR sensor to interrupt the normal audio signal if facility is in use. In this implementation, the navigation system 100 will continue in a normal mode after the proximity sensor registers that the stall is no longer occupied.

In some implementations, the sink installation 106 may include a sensor to assist the user in locating a sink. In some implementations, the sensor may provide audio signals for location only or for occupancy, as well. If the sensor indicates that the sink is occupied by use or by a proximity sensor, the sink installation 106 may play a distinct audio signal or not have any audio signal.

In some implementations, the paper towel installation 110 may include a sensor to sense whether there are paper towels in a paper towel dispenser. If the sensor indicates that there are no paper towels, the paper towel installation 110 may play a distinct audio signal to indicate to the user that the paper towel dispenser is empty or not have any audio signal. In some implementations, a soap installation 108 may include a sensor to sense whether there is soap in a soap dispenser. If the sensor indicates that there is no soap, the paper towel installation 110 may play a distinct audio signal to indicate to the user that the paper towel dispenser is empty or not have any audio signal.

In some implementations, the audio signals may continue until the user terminates the system 100. The user may terminate (or end) the system by actively initiating an end operation within the navigation system 100 via an exit installation 112 or automatically by when leaving the restroom.

Figure 2:
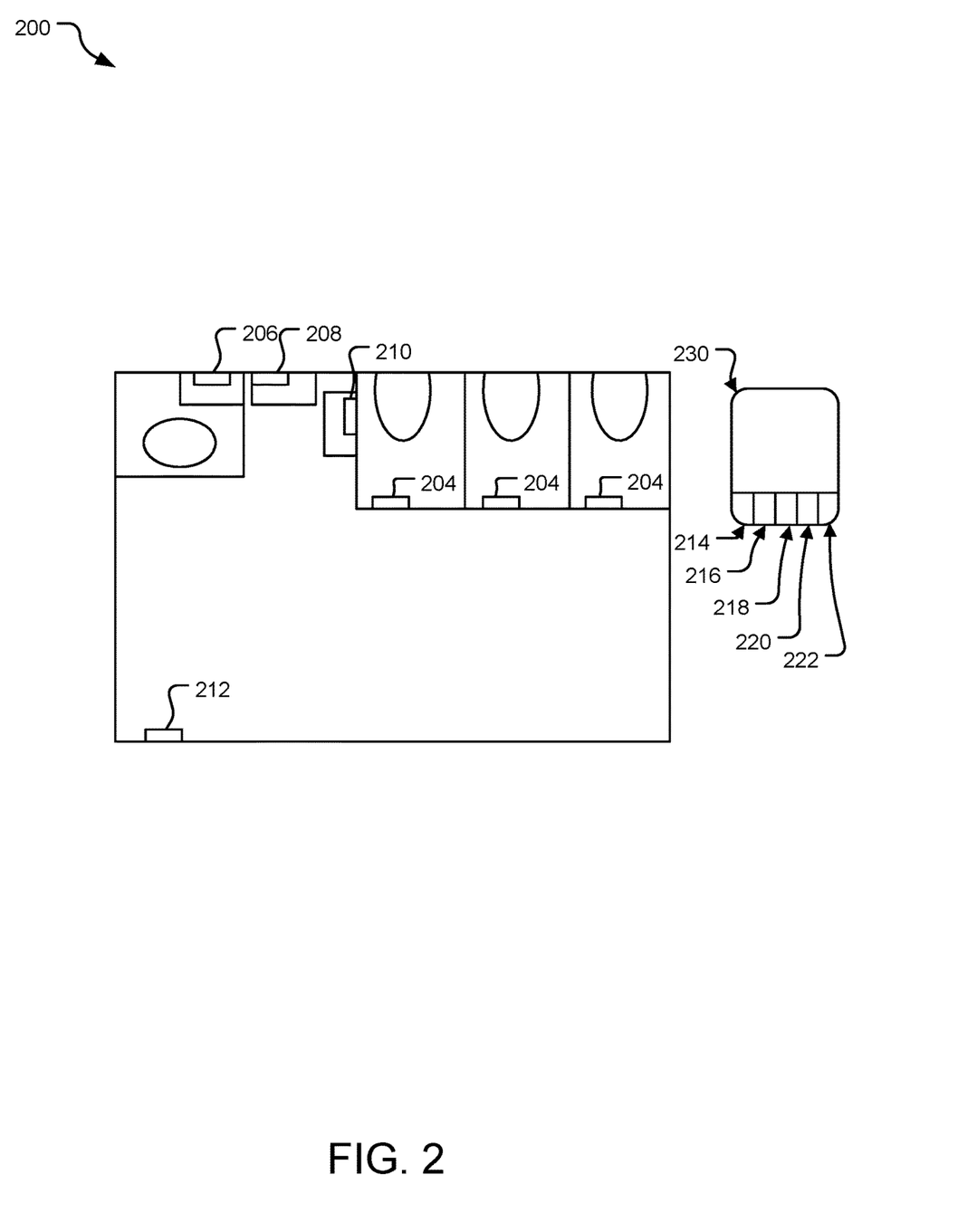
FIG. 2 is an overhead view of an example navigation system installed in a public restroom.

FIG. 2 is an overhead view of a public restroom equipped with a remotely triggered navigation system 200. The user has a remote 230 to trigger the remotely triggered navigation system 200 when a user enters the restroom. In some implementations, the remote 230 has buttons that the user can press to locate specific utilities or components in the bathroom. Each button corresponds to a specific fixture installation. For example, the remote 230 in FIG. 2 has a toilet locator button 214, a sink locator button 216, a soap dispenser locator button 218, a paper towel dispenser location button 220, and an exit locator button 222, each corresponding to a toilet installation 204, a sink installation 206, a soap installation 208, a paper towel installation 210, and an exit installation 212. In some implementations, a remote, cane, or other device held by the user may have a panic button in case of emergency or other required assistance.

When the user enters the restroom, the user presses the toilet locator button 214. The toilet installation 204 may include a receiving circuit and a speaker. In some implementations, the speaker may be located in a device carried by a user, such as the remote or a smart phone.

When the toilet installation 204 receives a signal from the remote 230, the speaker plays a specified sound. The sound may be a tone different from other installation tones, or a sequence of sounds or beeps. In another implementation, the toilet sound is simply the word "toilet." If the navigation system 200 is installed in a men's restroom, the toilet locator button 214 may also trigger an installation on a urinal. In another implementation, the remote 230 may include a separate button for the urinal in the men's restroom.

The toilet installation 204 or other installations may also include a proximity sensor to determine whether the installation is occupied, and send feedback notifying a user of an occupied status. In some implementations, the proximity sensor will determine a fixture is occupied and prevent feedback to the user, or guide the user only to an unoccupied stall or urinal. For example, if all the toilets in the restroom are occupied, when the user presses the toilet locator button 214, either no toilet sound will play or a different sound will play signifying that the toilets are all occupied. The user will continue to press the toilet locator button 214 until the normal toilet sound plays, indicating that there is an unoccupied toilet.

After using the toilet or urinal, the user may press a sink locator button 216. The sink locator button 216 signals the sink installation 206 to make the designated sink sound. In one implementation, the sink installation 206, or other installations, include a proximity sensor so that the sink sound will stop playing once the user reaches the sink and so that the sink sound will not play if another person is using the sink.

In some implementations, the navigation system 200 may have locator buttons for a sink installation 206, a soap installation 208, and a paper towel installation 210. The remote 230 may be linked so that the soap installation 208 plays an audio signal automatically after the sink is turned on and the paper towel installation 210 plays an audio signal automatically after the sink is turned off. Additionally, the paper towel installation 210 may include a sensor to sense whether there are paper towels in the paper towel dispenser. If the sensor indicates that there are no paper towels, the paper towel installation 210 will play a distinct audio signal to indicate to the user that the paper towel dispenser is empty.

After using the sink, soap dispenser, and paper towels, the user may press the exit locator button 222 to trigger an exit installation 212. The exit installation 212 may make a designated exit sound, which is distinct from the sounds made by the other installations. In some implementations, the navigation system may deactivate automatically after a predetermined amount of time.

Installations may be added for air powered hand dryers, personal hygiene product dispensers, and any other restroom components. Additionally, in another implementation, the user may activate the remotely triggered navigation system using a smart phone and smart phone application instead of the remote 230. In some implementations, a user may have headphones attached to a device, such as the remote or a smartphone, so that only the user can hear the audio sounds. In another implementation, the remote may vibrate in response to the user pressing any locator button, with the vibrations becoming more intense as the user gets closer to the corresponding installation.

The remote, cane, device, or other components of the navigation system may be powered by batteries, rechargeable batteries with a photo solar cell installed to recharge, reducing or eliminating the need for periodic replacements of batteries or hardwiring to a power source. The navigation system components may also be incorporated into software and downloaded onto a user's smart phone.

Figure 3:
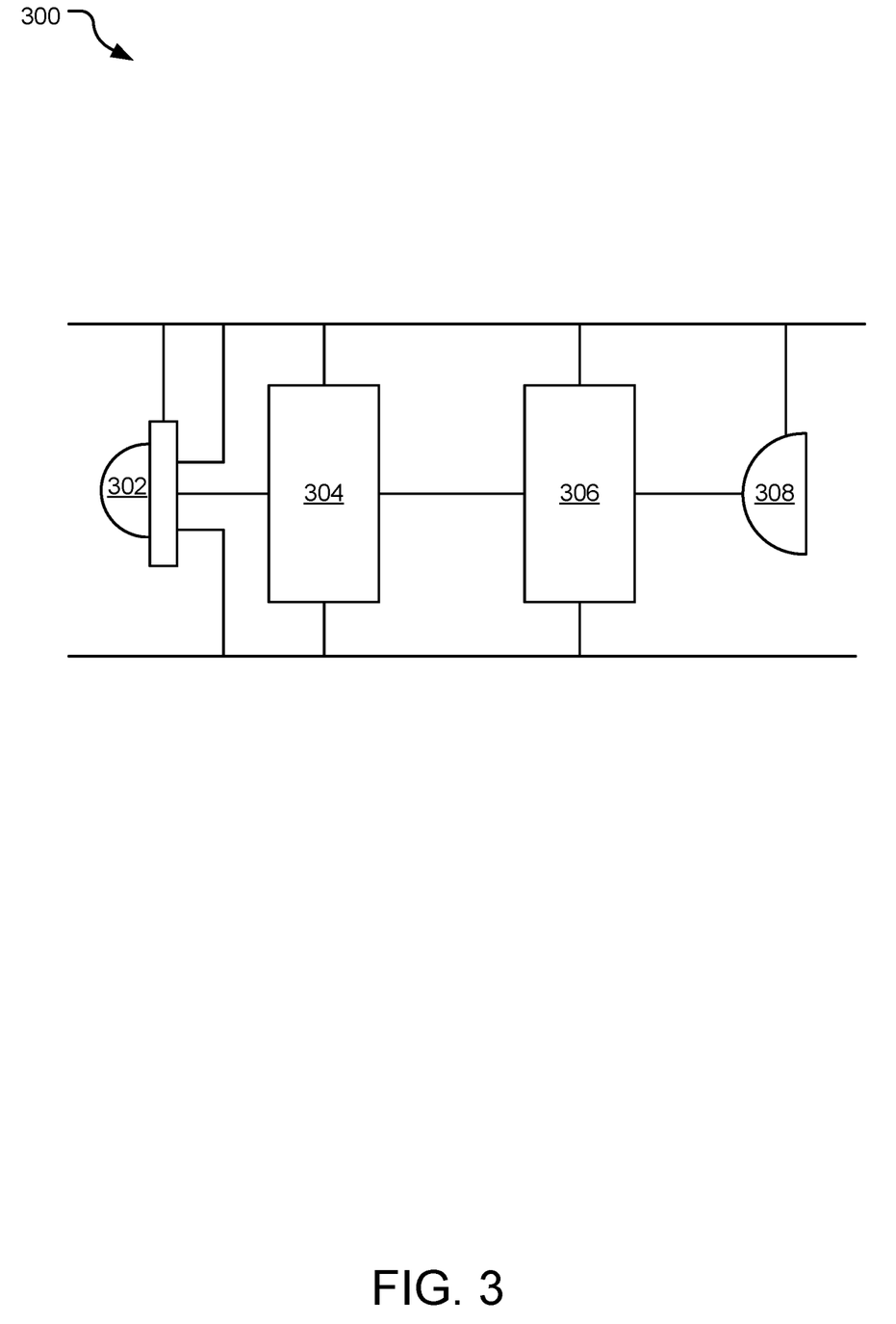
FIG. 3 is an example receiver circuit in a navigation system.

FIG. 3 shows an example receiver circuit 300 in a navigation system used for a toilet and a urinal. In some implementations, the example receiver circuit 400 may be used with other fixtures.

The receiver circuit 300 includes: a PIR sensor 302, a transistor 304, a RF relay 306, and a buzzer 308. The PIR sensor 302 senses motion, grounding the circuit if there is motion caused by another person using the toilet or urinal so that the toilet or urinal sound will not play. If the PIR sensor 302 does not sense any motion, the RF relay 306 receives a signal from a remote (e.g. remote 230 in FIG. 2), which activates the buzzer 308.

In some implementations, feedback may be received from infrared sensor detectors using Bluetooth to audio. There may be auditory feedback from an ultrasonic sensor package identifying certain distances to obstacles. An RFID may identify the location of fixtures and a tone varying in pitch may occur correlating to the general direction of the fixtures. The closer the user (and the remote, smart phone, cane, or other device) is to the fixture, the higher the pitch. In some implementations, there may be a voice synthesizer module and a language file incorporated into the navigation system.

Figure 4:
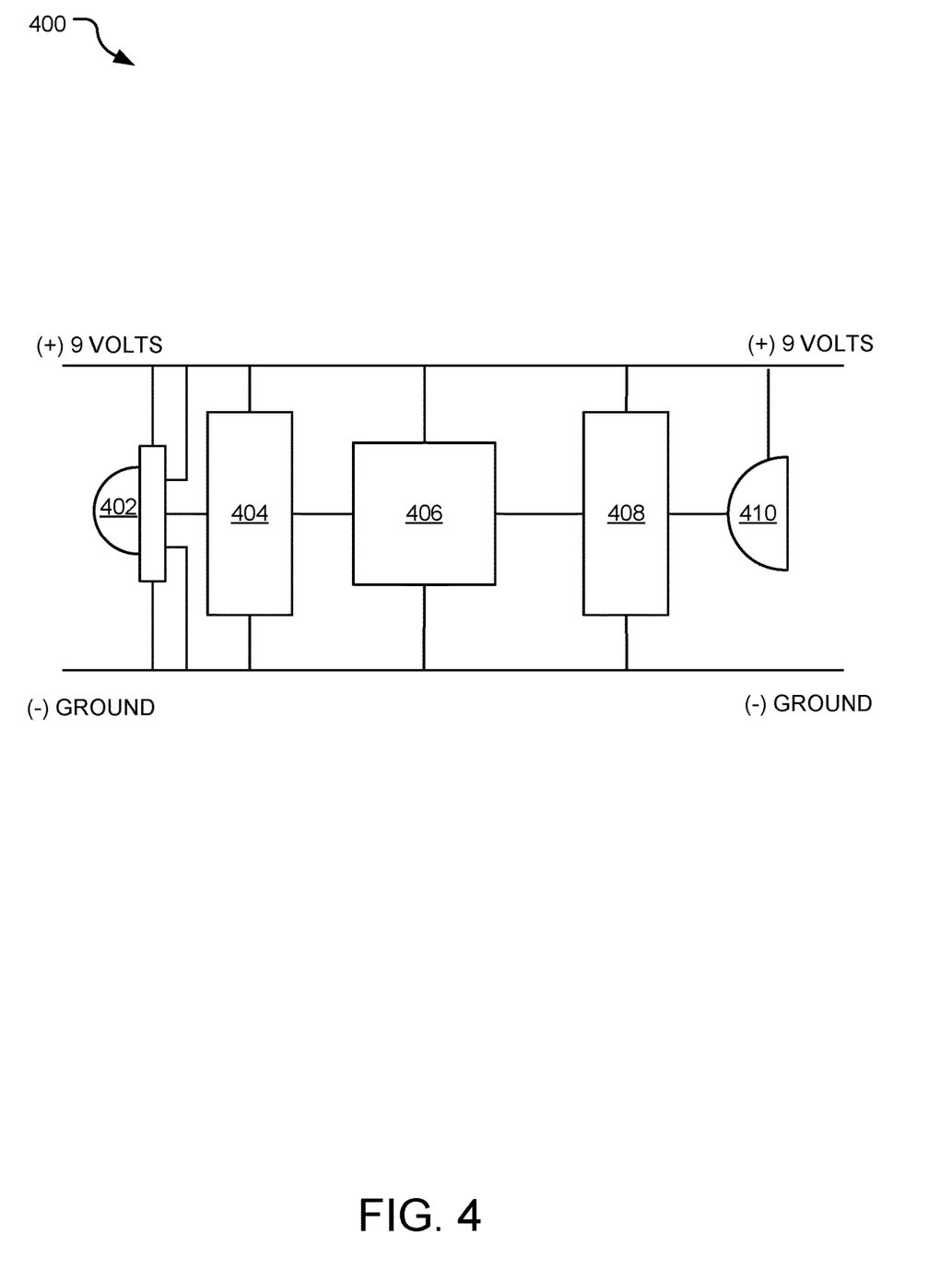
FIG. 4 is an example receiver circuit in a navigation system.

FIG. 4 shows an example receiver circuit 400 in a navigation system used for a soap dispenser and a towel dispenser. In some implementations, the example receiver circuit 400 may be used with other fixtures.

The receiver circuit 400 includes: a PIR sensor 402, a transistor 404, a RF relay 406, a timer circuit 408, and a buzzer 410. The PIR sensor 402 senses motion, grounding the circuit if there is motion caused by another person at the sink so that the sink sound will not play. If the PIR sensor 402 does not sense any motion, the RF relay 406 receives a signal from a remote (e.g. remote 230 in FIG. 2), which activates the buzzer 410. The timer circuit 408 controls the timing between the soap and paper towel sounds playing. The frequencies received by the receiver circuit 300 in FIG. 3 and receiver circuit 400 in FIG. 4 are distinct frequencies so that each button on the remote 212 activates only one receiver circuit.

In some implementations, feedback may be received from infrared sensor detectors using Bluetooth to audio. There may be auditory feedback from an ultrasonic sensor package identifying certain distances to obstacles. An RFID may identify the location of fixtures and a tone varying in pitch may occur correlating to the general direction of the fixtures. The closer the user (and the remote, smart phone, cane, or other device) is to the fixture, the higher the pitch. In some implementations, there may be a voice synthesizer module and a language file incorporated into the navigation system.

It is contemplated that various frequencies may be used, depending on the implementation. For example, different countries utilize different frequencies. The disclosed technology may be used with the required frequency for a desired location.

Figure 5:
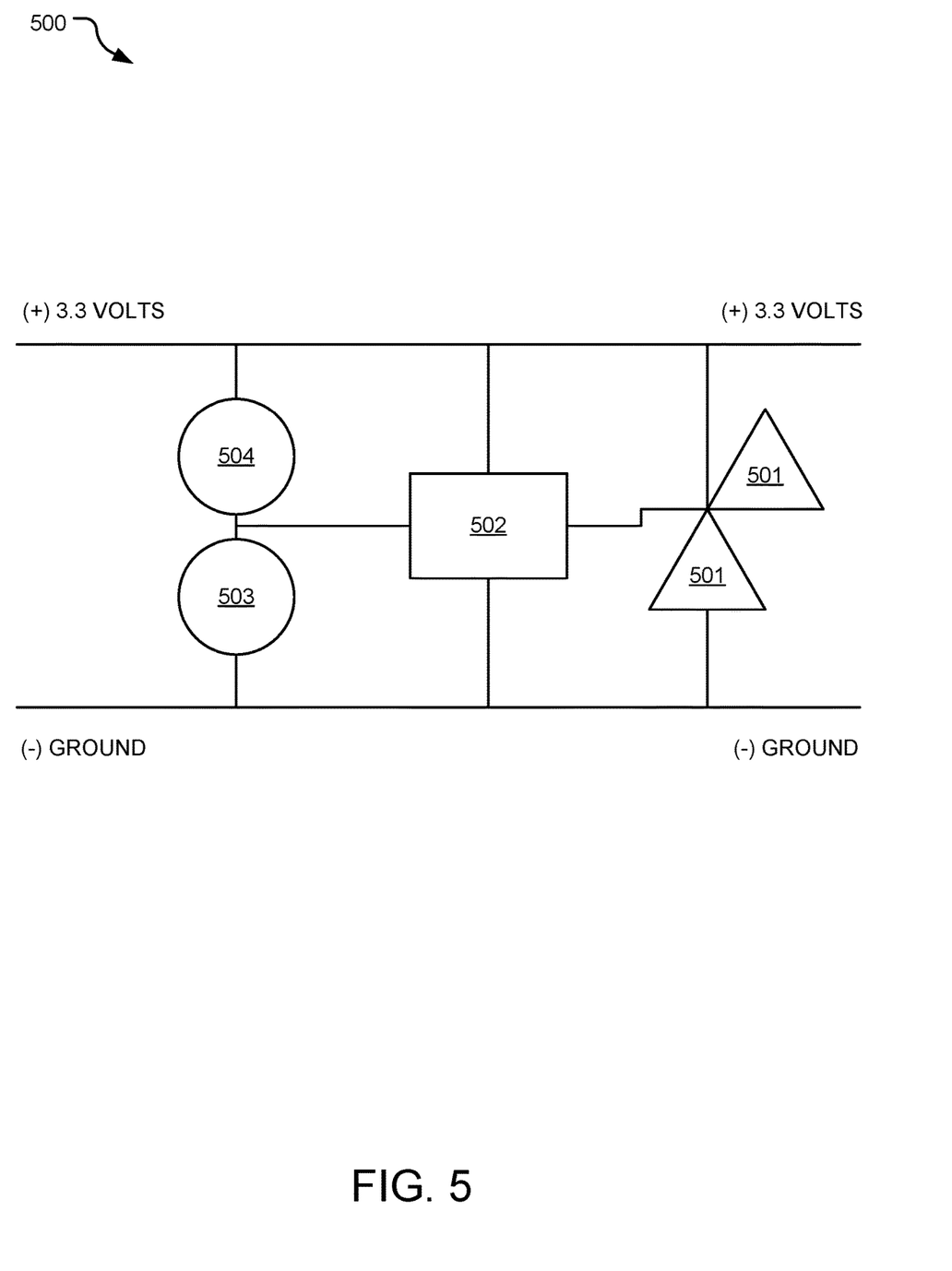
FIG. 5 is an example navigation circuit in a navigation system.

FIG. 5 is an example navigation circuit 500 in a navigation system for a cane. In some implementations, the example navigation circuit 500 may be included in a module in the cane. For example, the module may be mounted in an end of the case for communications with an installation pathway. The example navigation circuit 500 communicates with the installation pathway, which is electrically connected to fixture installations. Signals can be transmitted from the fixture installations regarding the location and/or occupancy status of the fixtures via the installation pathway to the cane.

In some implementations, the installations pathway is an electrical path in the room between the cane, a remote, a smart phone or other device. In some implementations, the installations pathway is an electrical path located on the floor of the room, which provides an actual pathway for which a user to follow as the user navigates around the room. For example, the installation pathway may be a pattern of lines or textured flooring. An installation pathway may include radio frequency identification (RFID). A sensor may sense either the pattern, colors, signals, tags, or texture, for example, and communicate signals or directions in the pathway to a user via auditory or tactile feedback.

The circuit 500 in FIG. 5 includes: at least one IR sensor 501, a computer processing unit 502, a vibratory motor 503, and a buzzer/speaker 504. The IR sensor 501 senses changes in light from the installation pathway (not shown) which are input to the CPU 502. A pattern of lines varying in color which are identified by the infrared sensors and in turn provide feedback through the processor to the vibrating motor and/or Bluetooth audio.

The CPU 502 activates a vibratory motor 503 and/or a buzzer/speaker 504 as tactile and/or audio feedback, respectively, depending upon readings and programming from the CPU 502. The tactile and/or audio feedback provide information to the user specific to location and/or occupancy of fixtures to enable to user to navigate around the room.

Figure 6:
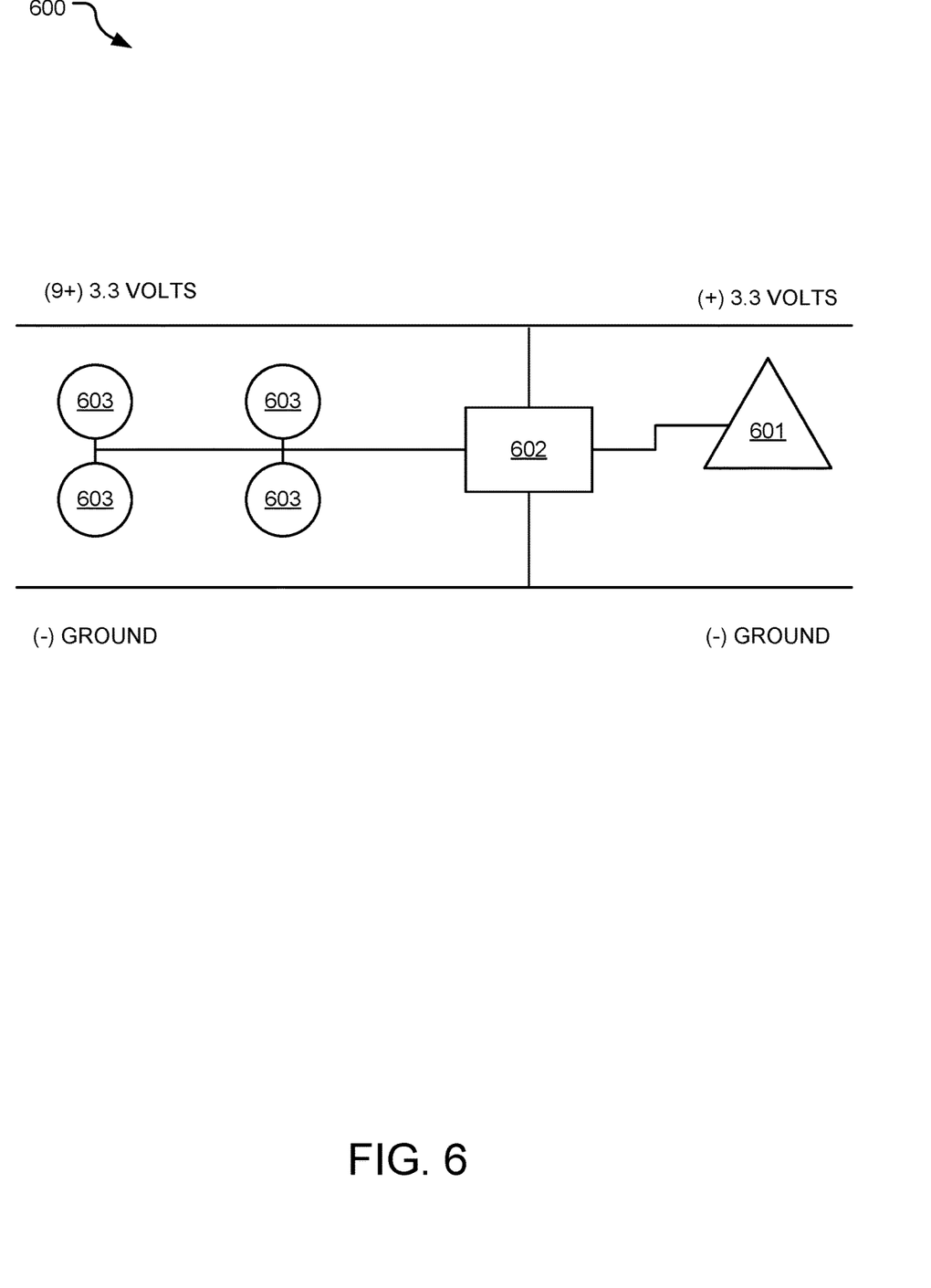
FIG. 6 is an example facility page circuit in a navigation system.

FIG. 6 is an example facility page circuit 600 in a navigation system for identifying fixtures using RFID tags in conjunction with receiver units, such as the receiver units in FIG. 3 and FIG. 4. The facility page circuit 600 includes: a transmitter 601, a computer processing unit 602, and four or more buttons 603. The buttons select a specific utility or component to activate, identifying an RFID tag at a fixture. Feedback is received by audio signal and/or tactile feedback through a cane-mounted device, such as the one described in FIG. 5. and/or the receivers described in FIG. 3 and FIG. 4. An RFID may identify the location of fixtures and a tone varying in pitch may occur correlating to the general direction of the fixtures. The closer the user (and the remote, smart phone, cane, or other device) is to the fixture, the higher the pitch. In some implementations, there may be a voice synthesizer module and a language file incorporated into the navigation system.

Figure 7:
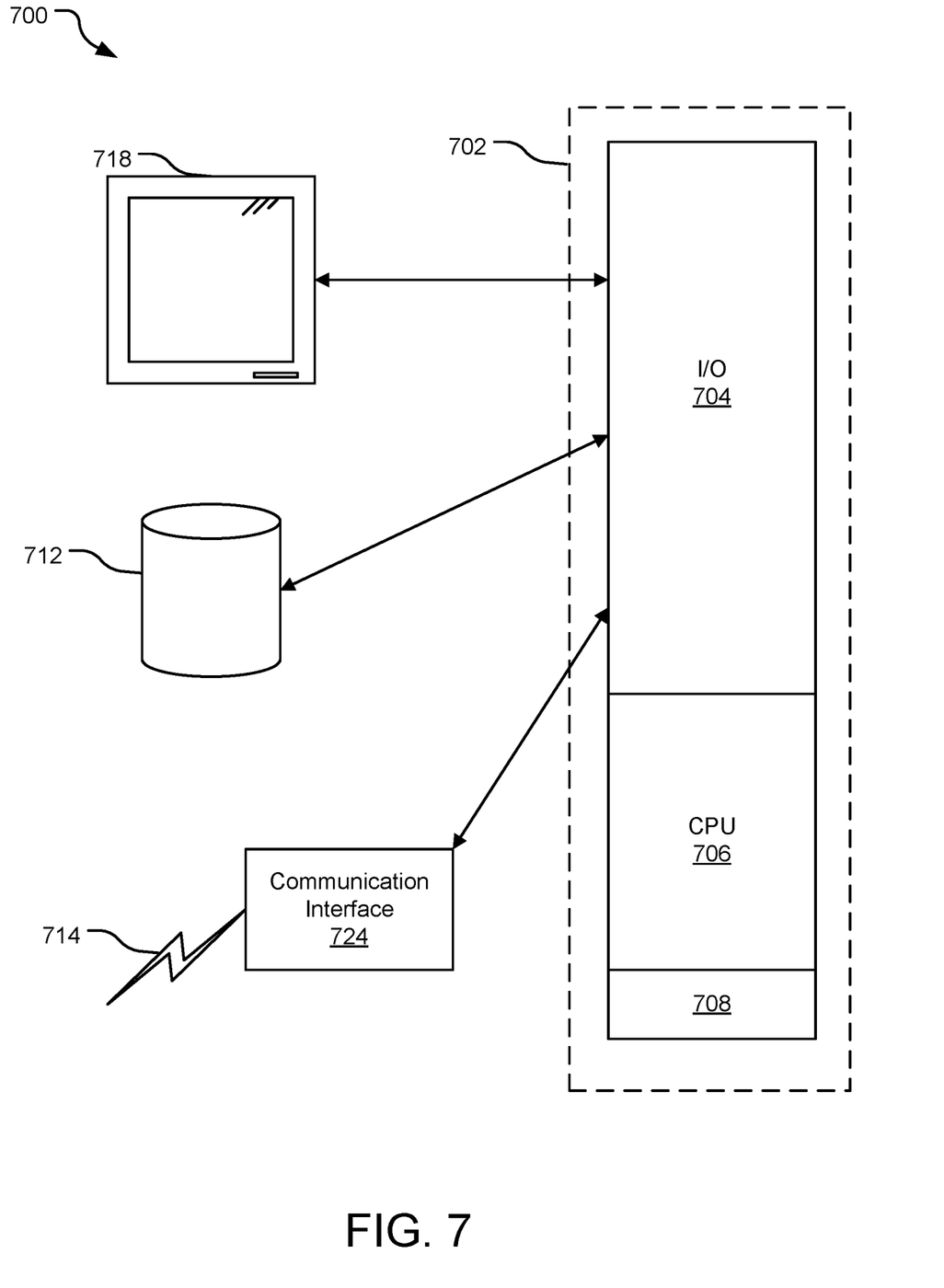
FIG. 7 a block diagram of a computer system suitable for implementing one or more aspects of a navigation system.

Referring to FIG. 7, a block diagram of a computer system 700 suitable for implementing one or more aspects of a navigation system is shown. The computer system 700 is capable of executing a computer program product embodied in a tangible computer-readable storage medium to execute a computer process. Data and program files may be input to the computer system 700, which reads the files and executes the programs therein using one or more processors. Some of the elements of a computer system 700 are shown in FIG. 4 wherein a processor 702 is shown having an input/output (I/O) section 704, a Central Processing Unit (CPU) 706, and a memory section 708. There may be one or more processors 702, such that the processor 702 of the computing system 700 comprises a single central-processing unit 706, or a plurality of processing units. The processors may be single core or multi-core processors. The computing system 700 may be a conventional computer, a distributed computer, or any other type of computer. The described technology is optionally implemented in software loaded in memory 708, a disc storage unit 712, and/or communicated via a wired or wireless network link 414 on a carrier signal (e.g., Ethernet, 3G wireless, 5G wireless, LTE (Long Term Evolution)) thereby transforming the computing system 700 in FIG. 7 to a special purpose machine for implementing the described operations.

The I/O section 704 may be connected to one or more user-interface devices (e.g., a keyboard, a touch-screen display unit 718, etc.) or a disc storage unit 712. Computer program products containing mechanisms to effectuate the systems and methods in accordance with the described technology may reside in the memory section 704 or on the storage unit 712 of such a system 700.

A communication interface 724 is capable of connecting the computer system 400 to an enterprise network via the network link 714, through which the computer system can receive instructions and data embodied in a carrier wave. When used in a local area networking (LAN) environment, the computing system 700 is connected (by wired connection or wirelessly) to a local network through the communication interface 724, which is one type of communications device. When used in a wide-area-networking (WAN) environment, the computing system 700 typically includes a modem, a network adapter, or any other type of communications device for establishing communications over the wide area network. In a networked environment, program modules depicted relative to the computing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in navigation. A navigation system may be implemented using a general purpose computer and specialized software (such as a server executing service software to a workstation or client), a special purpose computing system and specialized software (such as a mobile device or network appliance executing service software), or other computing configurations. In addition, navigation parameters may be stored in the memory 708 and/or the storage unit 712 and executed by the processor 702.

Figure 8:
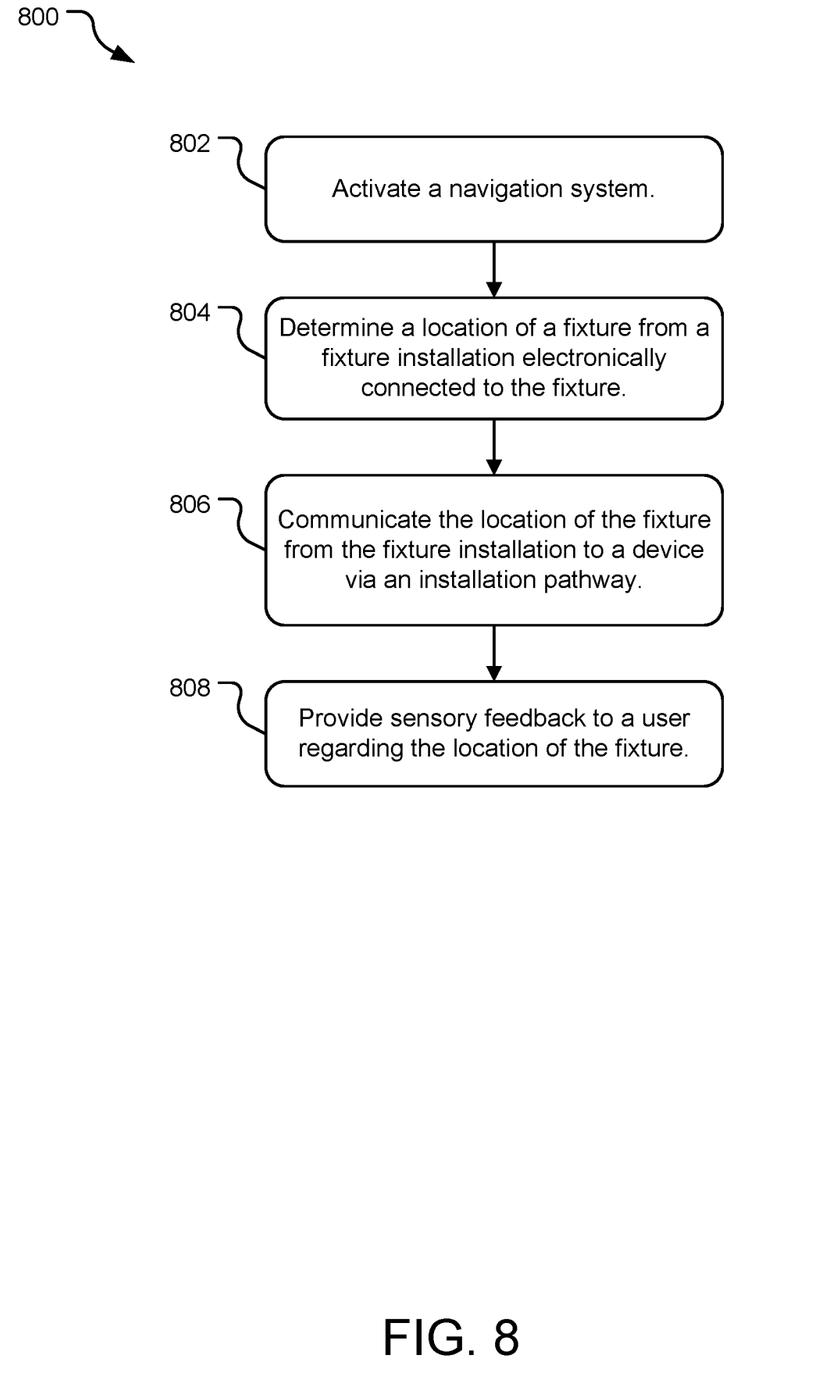
FIG. 8 is a flowchart of example operations for locating a fixture with a navigation system.

FIG. 8 is a flowchart of example operations 800 for locating a fixture with a navigation system. An operation 802 activates a navigation system in a restroom. An operation 804 determines a location of a fixture in the restroom from a fixture installation electronically connected to the fixture. An operation 806 communicates the location of the fixture from the fixture installation to an electronic device via an installation pathway. An operation 808 provides sensory feedback to a user regarding the location of the fixture.

Figure 9:
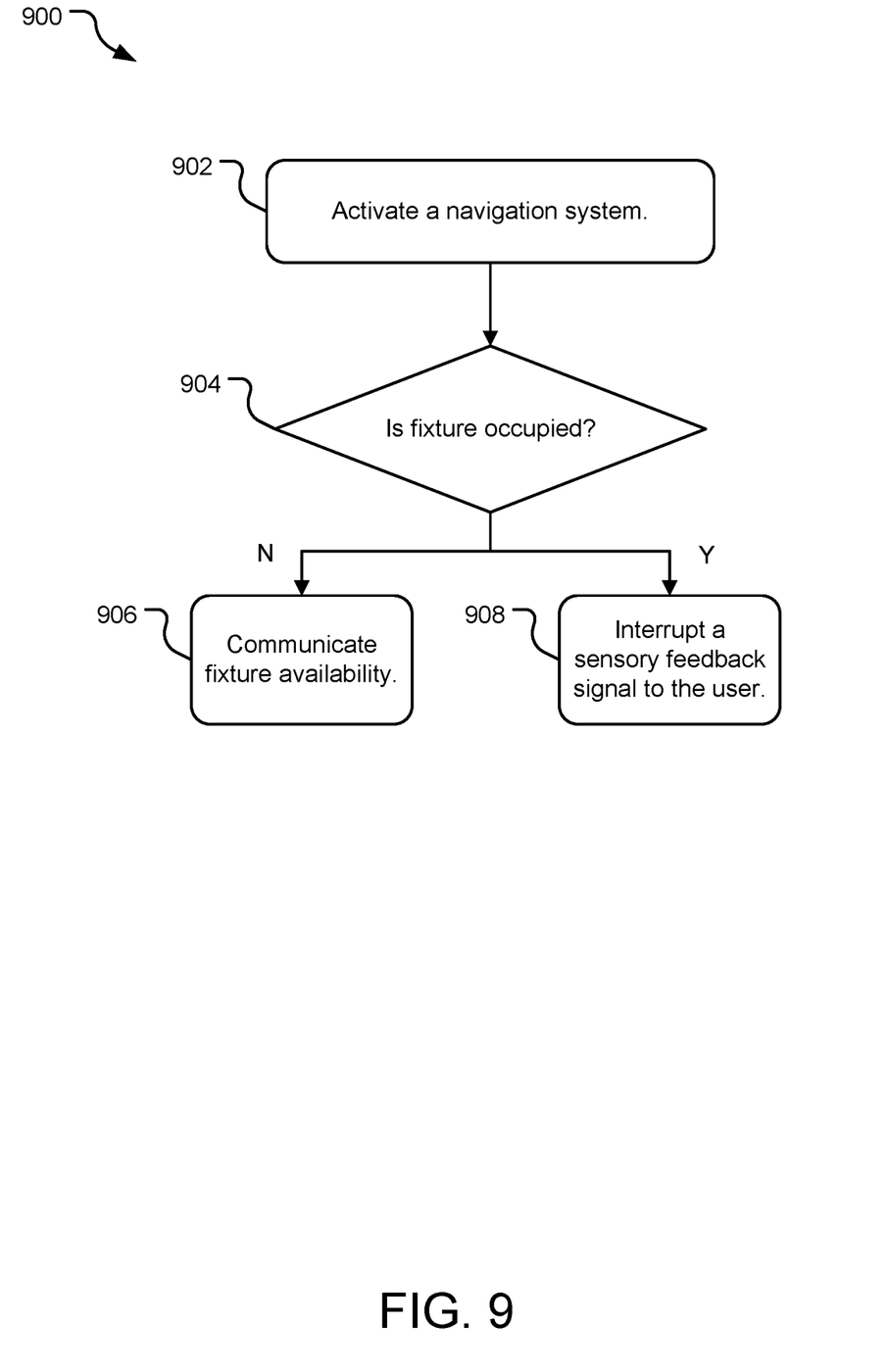
FIG. 9 is a flowchart of example operations for of determining an occupancy status of a fixture with a navigation system A further understanding of the nature and advantages of the present technology may be realized by reference to the figures, which are described in the remaining portion of the specification.

FIG. 9 is a flowchart of example operations 900 for determining an occupancy status of a fixture with a navigation system. An operation 902 activates a navigation system in a restroom.

An operation 904 determines an occupancy status of a fixture in the restroom with a proximity sensor. If operation 904 determines that the fixture is not occupied, then an operation 906 communicates the availability of the fixture. The proximity sensor sends a signal to an electronic device via a fixture installation and via the fixture installation and the installation pathway. The device provides auditory or tactile feedback to a user and the user is notified of the fixture availability. The sensory feedback to the user may occur via at least one of a cane, a remote, a smart phone, or other device.

If operation 904 determines that the fixture is occupied, then an operation 908 interrupts any feedback signals to the user, for example, via a passive infrared sensor. By preventing the feedback signals, the user receives no notifications, and thus, learns that the fixture is not available.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A navigation system, comprising:
   an installation pathway flooring for navigation to a plurality of fixtures;
   a sensor to sense and communicate signals in the installation pathway flooring; and
   a computer processing unit to activate sensor signal feedback responsive to the signals in the installation pathway flooring indicative of a fixture location.

2. The navigation system of claim 1, further comprising:
   an electronic circuit to communicate with the installation pathway flooring, the installation pathway flooring electronically connected to a plurality of installations, wherein each installation is electronically connected to a fixture.

3. The navigation system of claim 1, wherein the sensor senses at least one of pattern, color, tags, and texture in the installation pathway flooring.

4. The navigation system of claim 1, wherein at least one installation is configured to determine an availability status of a fixture.

5. The navigation system of claim 1, wherein the installation pathway flooring is a map on the ground that guides a user.

6. The navigation system of claim 1, further comprising a facility page circuit to identify the plurality of fixtures.

7. The navigation system of claim 1, wherein the sensor is an IR sensor to sense change in light from the installation pathway flooring.

8. The navigation system of claim 7, wherein the installation pathway flooring includes radio frequency identification.

9. The navigation system of claim 7, wherein the sensor communicates the sensor signal feedback in the installation pathway flooring to include at least one of an auditory signal and a tactile signal.

10. The navigation system of claim 9, wherein the sensor signal feedback provide information specific to location of the plurality of fixtures.

11. The navigation system of claim 9, wherein the sensor signal feedback provide information specific to availability of the plurality of fixtures.

12. A method comprising:
    determining a location of a fixture from a fixture installation in a navigation system, the fixture installation electronically connected to the fixture;
    communicating the location of the fixture to an electronic device via an installation pathway;
    receiving sensor signal feedback from the fixture installation indicative of the fixture location and an availability status; and
    navigating a user on the installation pathway responsive to the sensor signal feedback.

13. The method of claim 12, further comprising:
    interrupting the sensor signal feedback to a user via a passive sensor responsive to determining that the fixture is unavailable.

14. The method of claim 12, further comprising:
    communicating the sensor signal feedback to the user via at least one of an auditory signal and a tactile signal.

15. The method of claim 12, wherein receiving sensor signal feedback further comprises sensing at least one of pattern, color, tags, and texture in the installation pathway with a sensor.

16. One or more tangible computer-readable storage media encoding computer executable instructions for executing on a computer system a computer process for navigation, the computer process comprising:
    activating a navigation system;
    determining a location and an availability status of a fixture from a fixture installation, the fixture installation electronically connected to the fixture in the navigation system;
    communicating the location of the fixture to an electronic device via an installation pathway; and
    receiving sensor signal feedback from the fixture installation indicative of the fixture location and the availability status.

17. The one or more tangible computer-readable storage media of claim 16, further comprising:
    interrupting the sensor signal feedback to a user via a passive sensor responsive to determining that the fixture is occupied.

18. The one or more tangible computer-readable storage media of claim 16, further comprising:
    communicating the sensor signal feedback to the user via at least one of an auditory signal and a tactile signal.

19. The one or more tangible computer-readable storage media of claim 16, wherein receiving sensor signal feedback further comprises sensing at least one of pattern, color, tags, and texture in the installation pathway with a sensor.

20. The one or more tangible computer-readable storage media of claim 16, further comprising:

navigating a user on the installation pathway responsive to the sensor signal feedback.

* * * * *